United States Patent [19]

Matsumoto et al.

[11] Patent Number: 4,748,608
[45] Date of Patent: May 31, 1988

[54] SERVO APPARATUS FOR TRACKING AND ROTATIONAL SPEED CONTROL

[75] Inventors: Keiichi Matsumoto, Tokorozawa; Yoshio Aoyagi, Kawagoe, both of Japan

[73] Assignee: Pioneer Electronic Corporation, Tokyo, Japan

[21] Appl. No.: 692,918

[22] Filed: Mar. 12, 1985

[51] Int. Cl.$^4$ ............................................. G11B 7/00
[52] U.S. Cl. ...................................... 369/43; 360/77; 360/73
[58] Field of Search .................................. 369/43–46, 369/32, 33, 50; 358/342; 250/201–204; 360/77, 78, 73

[56] References Cited

U.S. PATENT DOCUMENTS 4,371,899 2/1983 Ceshkovsky et al. .......... 358/342 X

Primary Examiner—Robert L. Richardson
Attorney, Agent, or Firm—Foley & Lardner, Schwartz, Jeffery, Schwaab, Mack, Blumenthal & Evans

[57] ABSTRACT

A system for playing back information recorded on a recording disc includes a first servo control system responsive to a tracking error signal, which adjusts the position of an information reading point of a pickup relative to the recording track on the recording disc, and a second servo control system responsive to a synchronizing signal contained in the playback information signal, which adjusts the speed of rotation of the recording disc. The system is further provided with first detection means responsive to the tracking error signal for detecting a condition where the information reading point has moved across a predetermined number of sections of recording track in a radial direction of the recording disc, and a second detection means responsive to the synchronization signal for detecting a condition where the synchronization signal is not read out up to a predetermined number regularly, and a control means for suspending the servo control operation of at least one of the first and second servo control systems in accordance with output signals of the first and second detection means.

4 Claims, 6 Drawing Sheets

Fig. 3
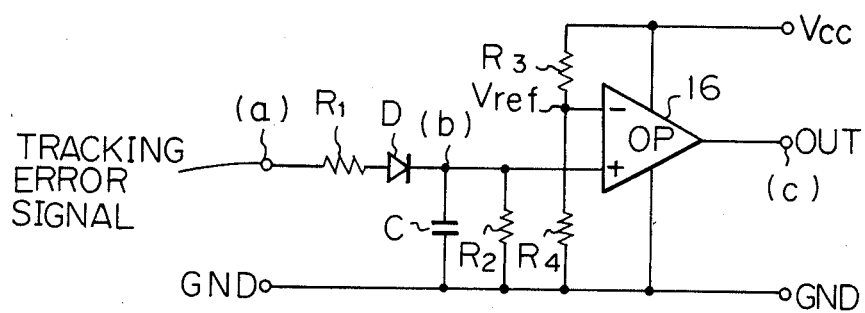
Fig. 4A
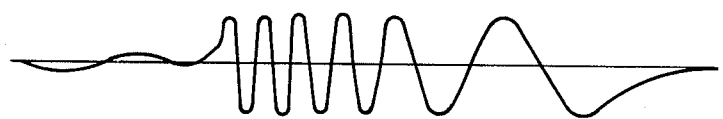
Fig. 4B
Fig. 4C
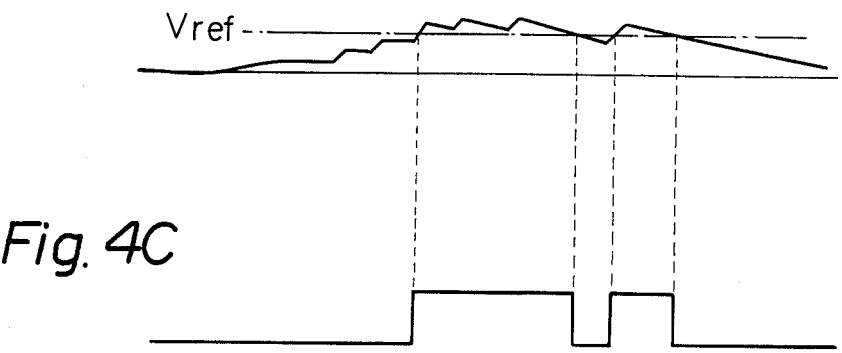

SERVO APPARATUS FOR TRACKING AND ROTATIONAL SPEED CONTROL

BACKGROUND OF THE INVENTION

1. Field of the Invention

The present invention relates to a system for playing back information recorded on a recording disc, and more specifically to a system in which the position of an information reading point of a pickup is adjusted in a radial direction of the disc by a servo control system and the speed of rotation of the recording disc is controlled by a spindle servo control system.

2. Description of Background Information

In systems for playing back information signal recorded on a recording disc such as a digital audio disc player system or a video disc player system, the position of an information reading point of the pickup (focal point of the reading light beam in the case of optical playback systems) is generally controlled by a tracking servo system and a carriage servo system which controls the position of a carriage carrying the pickup in a radial direction of the recording disc. In addition, the rotational speed of the disc is controlled by the operation of a spindle servo system which is responsive to a synchronizing signal such as a frame synchronizing signal which is regularly produced when the information is normally read out from the recording disc.

In conventional systems of this type, the absence of the frame synchronization signal (which is to be produced regularly) is detected so that the servo control operation of the spindle servo system is stopped and the resumption of the servo control operation is made when the regular generation of the frame synchronization signal is assured. However, those systems were not provided with means for providing a mutual relation between the control of the spindle servo system and the control of the tracking servo system and the carriage servo system.

Therefore, it was often the case that the regular reproduction of the synchronization signal is continuously disturbed when a tracking deviation, i.e., the deviation of the information reading point of the pickup from the recording track, occurs due to an external disturbance such as a shock or vibration is applied to the system.

SUMMARY OF THE INVENTION

The present invention is contemplated to obviate the above problem of the conventional systems and an object of the present invention is to provide a system for playing back recorded information in which the loss of control of the spindle motor, the carriage motor, and the tracking actuator is prevented even though the position of the information reading point deviates or comes off from the recording track due to an external disturbance such as the vibration from outside.

According to the present invention, the information playing back system is constructed to detect the absence of the frame sync signal and the deviation of the position of the information reading point from the recording track is detected in accordance with the tracking error signal, and the servo control operation of either one of the tracking servo system and the spindle servo system is stopped in accordance with these detection signals.

Further scope and applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

FIG. 3 is a circuit diagram illustrating an example of the circuit construction of the tracking deviation detection circuit of the playback system of FIG. 2; and FIGS. 4A through 4C are waveform diagram showing waveforms of signals (a) through (c) appearing at various point of the tracking deviation detection circuit of FIG. 3.

DESCRIPTION OF THE PREFERRED EMBODIMENTS

Figure 1:
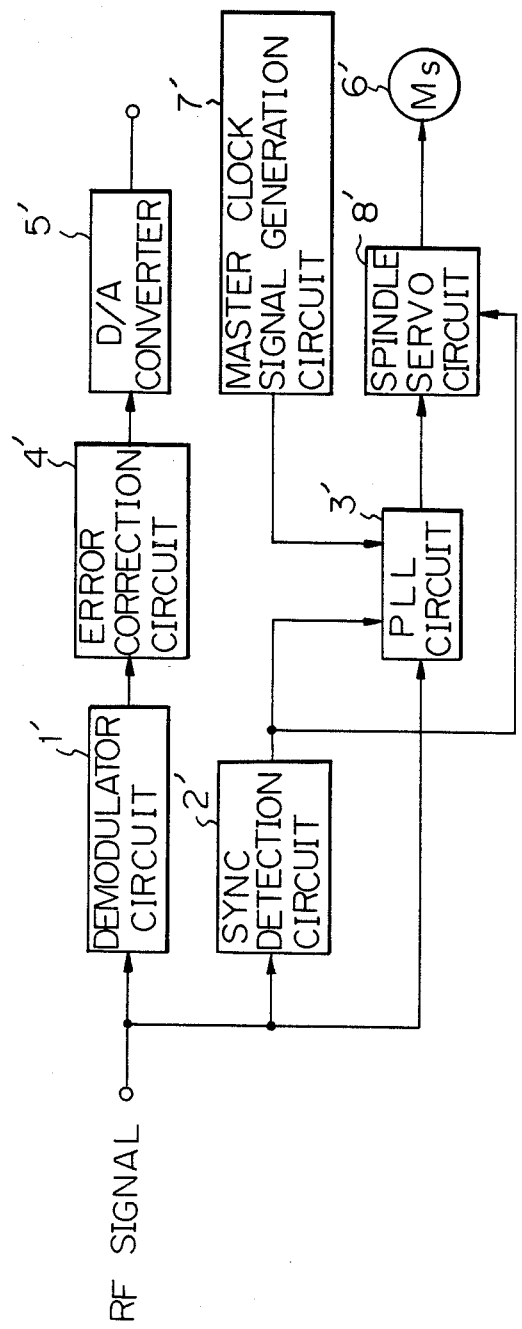
FIG. 1 is a block diagram showing a part of the construction of a conventional system for playing back information recorded on a recording disc.

Before entering into the explanation of the preferred embodiments, reference is first made to FIG. 1 in which an example of the conventional information playing back system is illustrated.

In FIG. 1, a radio frequency playback information signal (referred to simply as "RF signal" hereinafter) which is read out from a recording disc (not illustrated) by a pickup is applied to a demodulator circuit 1', a sync (synchronization) detection circuit 2', and a PLL (Phase Locked Loop) circuit 3'. In the demodulator circuit 1', the RF signal including interleaved data is demodulated to rearrange the data in the proper order. An output signal of the demodulator circuit 1' is applied to an error correction circuit 4' in which errors in the data are corrected, and then applied to a D/A (digital to Audio) converter 5' in which the input signal is converted to an audio signal. The sync detection circuit 2' is constructed such that a detection signal is generated in the event that frame sync signals contained in the RF signal are not read out up to a predetermined number regularly. Thereafter, the generation of the detection signal is stopped when the proper frame sync signals are read out up to the predetermined number regularly. On the other hand, the PLL circuit 3' detects a clock signal component of the RF signal and synchronizes it with a clock signal supplied from a master clock signal generation circuit 7'. A spindle servo cirucit 8' is provided so as to perform the control of a spindle motor 6' which supports the disc and rotates it, in accordance with a control voltage produced at a VCO (Voltage Controlled Oscillator) of the PLL circuit 3'. The PLL circuit 3' is so constructed that it is compulsorily released from a phase lock state in accordance with an external control signal, and that it is capable of sweeping the control voltage of the VCO within a predetermined voltage range. Also, the spindle servo circuit 8' is constructed to produce a voltage which is capable of maintaining the rotation of the spindle motor 6' and to supply the same to the spindle motor 6', in accordance with an external control signal.

The operation of the above explained system is further described. During the reading operation of the system, if the information reading point of the system deviates or comes off from the recording track due to an external disturbance such as the vibration from outside, the data in the RF signal may become discontinous and may result in the disorders in the RF signal. In that event, it becomes impossible to properly reproduce the frame sync signal. If the frame sync signals are not produced up to a predetermined number regularly, such a condition is detected by means of the sync detection circuit 2', and the detection signal is produced. At the same time, the PLL circuit 3' is compulsorily released from the phase lock state by the detection signal from the detection circuit 2', and the control voltage of the VCO in the PLL circuit 3' is swept within the predetermined voltage range. Under this condition, the spindle servo circuit 8' supplies the spindle motor with the voltage which is capable of maintaining its rotation in accordance with the detection signal from the sync detection circuit 2'. With this provision, the spindle motor 6' maintains its speed of rotation and the system continues this operation until the time when the proper frame sync signals are regularly produced up to the predetermined number.

When the frame sync signals are read out up to the predetermined number, the detection signal of the sync detector circuit 2' disappears and the spindle servo circuit 8' restart the servo control of the spindle motor 6' in accordance with the control voltage of the VCO within the PLL circuit 3'.

Thus, the conventional system is constructed so that the absence of the frame sync signal is detected and the lock-in of the spindle servo control is effected again in accordance with the detection signal. However, this is originally aimed for preventing the phase lock of the PLL circuit 3' at an erroneous frequency. Therefore, in these conventional systems, no measure is taken for the control of the tracking servo system and the carriage servo system even though the rotation of the spindle motor is maintained during the absence of the frame sync signal.

On the other hand, under the condition where the information reading point of the pickup deviates or comes off from the recording track, the tracking servo system becomes unlocked and the tracking actuator and the carriage motor will become out of control if this condition continues. Thus, as mentioned before, it becomes impossible to reproduce proper frame sync signals and to effect the restoration of the synchronized state of control.

Figure 2:
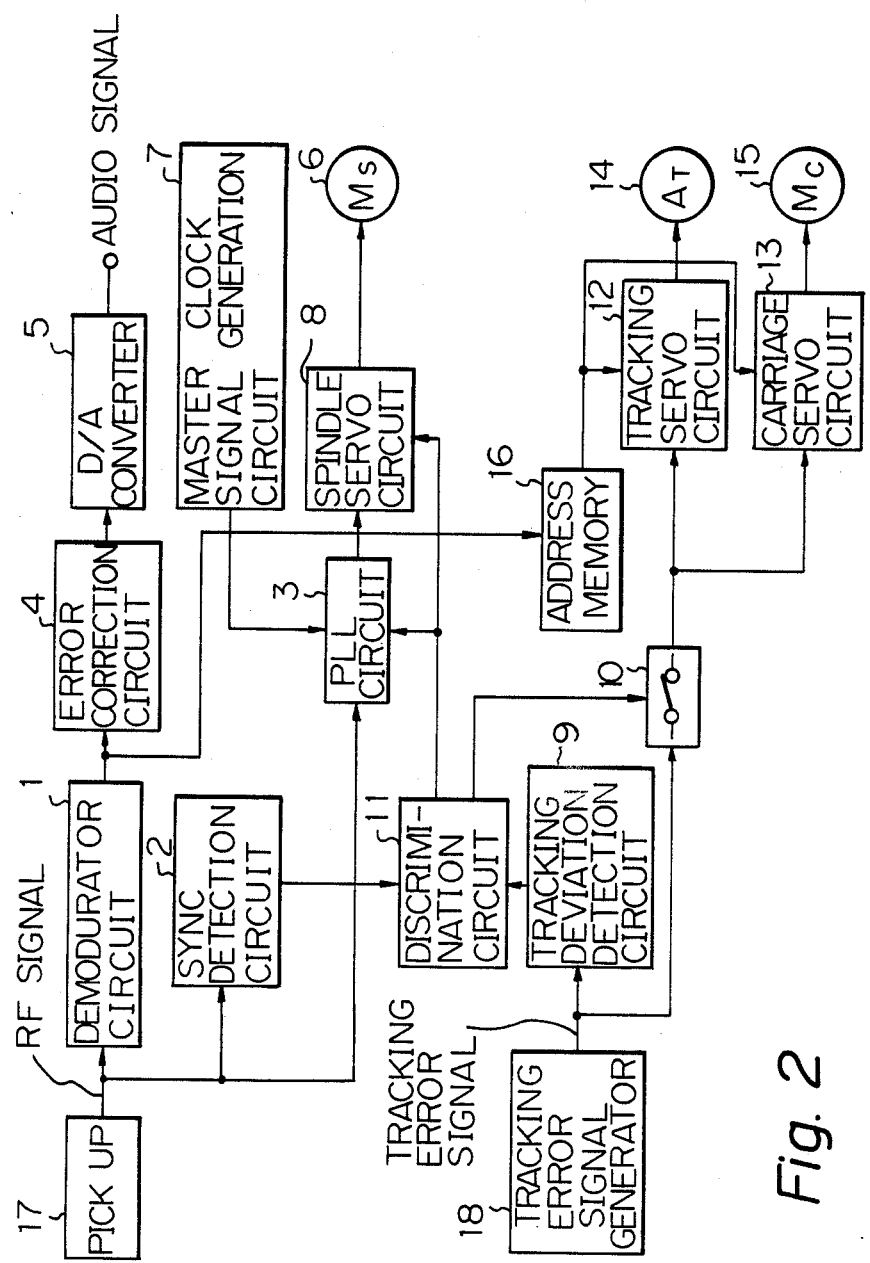
FIG. 2 is a block diagram showing major part of an embodiment of the system for playing back information recorded on a recording disc according to the present invention.

The preferred embodiment of the present invention will be explained with reference to FIGS. 2 to 4 of the accompanying drawings. FIG. 2 is a block diagram of the embodiment of the information playing back system according to the present invention. In FIG. 2, an RF signal read out from the recording disc by a pickup 17 is applied to a demodulator circuit 1, a sync (synchronization) detection circuit 2, and a PLL (Phase Locked Loop) circuit 3 in the similar manner as the conventional system of FIG. 1. In the demodulator circuit 1, the RF signal including interleaved data is demodulated so as to rearrange the data in the proper order. An output signal of the demodulator cirucit 1 is applied to an error correction circuit 4 in which errors in the data are corrected. An output signal of the error correction circuit 4 is in turn applied to a D/A (Digital to Analog) converter 5 in which the input signal is converted to an audio signal. The sync detection circuit 2 is constructed such that the a detection signal is generated in the event that frame sync signals contained in the RF signal are not read out up to a predetermined number regularly. When the proper frame sync signals are read out up to the predetermined number regularly, then the generation of the detection signal at the sync detection circuit 2 is stopped. The PLL circuit 3 detects a clock signal component of the RF signal and synchronizes it with a clock signal supplied from a master clock signal generation circuit 7. Further, the PLL circuit 3 is so constructed that it is compulsorily released from a phase lock state in accordance with a control signal, and that it is capable of sweeping the control voltage of the VCO within a predetermined voltage range. An output signal of the PLL circuit 3 which is produced at a VCO (Voltage Controlled Oscillator) thereof is supplied to a spindle servo circuit 8 which controls the rotation of a spindle motor 6 which supports the disc and rotates it. Also, the spindle servo circuit 8 is constructed to produce a voltage capable of maintaining the rotation of the spindle motor 6 and supplies the same to the spindle motor 6 in accordance with an external control signal.

In addition to the above circuit elements, a tracking error signal generator 18 connected to the pickup 17 is provided which produces a tracking error signal indicative of the relative distance between an information reading point of the pickup on the recording disc and a section of the recording track, in a radial direction of the disc (a direction perpendicular to the direction of the recording track). The tracking error signal produced at the tracking error signal generator 18 is supplied to a tracking deviation detection circuit 9 and a loop switch 10. Through the loop switch 10, the tracking error signal is supplied to a tracking servo circuit 12 and a carriage servo circuit 13 which respectively control a tracking actuator 14 and a carriage motor 15. The tracking deviation detection circuit 9 operates as a first detection means for detecting a state that the information reading point of the pickup has moved across a predetermined number of sections of the recording track when the deviation of the the information reading point from the recording track occurs and producing a detection signal. On the other hand, the above described sync detection circuit 2 is regarded as a second detection means. The output signal of the tracking deviation detection circuit 9, i.e. the detection signal, and the output signal of the sync detection circuit 2 are supplied to a discrimination circuit 11. The discrimination circuit 11 discriminates whether the information reading point deviates from a recording track or the PLL circuit 3 is locked to an erroneous frequency, and provides control signals to the loop switch 10, the PLL circuit 3, and the spindle servo circuit 8. In accordance with the control signal from the discrimination circuit 11, the loop switch 10 opens to stop the supply of the tracking error signal to the tracking servo circuit 12 and the carriage servo circuit 13. Similarly, in accordance with the control signal from the discrimination circuit 11, the PLL circuit 3 is released from the phase lock state, and the spindle servo circuit 8 produces the voltage for maintaining the rotation of the spindle motor 6.

The tracking servo circuit 12 drives the tracking actuatur 14 in accordance with the tracking error signal supplied through the loop switch 10 so that the position of information reading point is controlled in the radial direction of the disc. The carriage servo circuit 13 drive the carriage motor 15 in accordance with the tracking error signal supplied through the loop switch 10, so that the movement of a carriage (not illustrated) which carrying the pickup in the radial direction of the disc is controlled. In short, the tracking servo circuit 12 and the carriage servo circuit 13 together form a first servo control means for controlling the relative position of the information reading point with respect to the recording track in the radial direction of the disc. On the other hand, the spindle servo circuit 8 operates as a second servo control circuit. In addition, the system includes an address memory 16 connected to the demodulation circuit 1 for reading from data demodulated at the demodulating circuit 1, a latest address information of a section of the recording track which the information reading point follows, and stores it therein. The address information from the address memory 16 is then supplied to the tracking servo circuit 12 and the carriage servo circuit 13.

FIG. 3 shows an example of the circuit construction of the tracking deviation detection circuit 9. As shown, the circuit 9 includes a detection diode D which is supplied with a tracking error signal through a resistor $R_1$, a hold capacitor C for the peak hold operation, a discharging resistor $R_2$ for discharging the electric charge accumulated in the hold capacitor C, dividing resistors $R_3$ and $R_4$ for setting a reference voltage Vref, and a comparator 16 made up of an operational amplifier which receives the reference voltage Vref at an inverting input terminal thereof and an output voltage of the hold capacitor C at a non-inverting input terminal thereof.

The operation of the information playing back system having the above explained construction will be explained hereinafter with reference to the waveform diagram of FIG. 4. Since the basic operation of the splindle servo system is the same as the conventional systems, the explanation thereof is omitted.

Assume that an external disturbance such as a vibration or a shock is applied to the system and the information reading point of the pickup deviates from the recording track. Under this condition, the tracking error signal has a waveform of a latively large amplitude as illustrated in FIG. 4A. This tracking error signal (a) is applied to the tracking deviation detection circuit 9 of FIG. 3 where it is detected by the diode D. With the signal output from the diode D, the hold capacitor C is charged at a time constant which is determined by the resistance of the resistors $R_1$ and $R_2$ and the capacitance of the capacitor C. When the level of the tracking error signal becomes lower than a positive peak, the charge accumurated in the capacitor C is discharged through the discharging resistor $R_2$. These operations are repeated several times and the waveform of the voltage (b) developed across the terminals of the capacitor C will become such a waveform as iilustrated in FIG. 4B. When this voltage across the terminals of the capacitor C becomes larger than the reference voltage Vref determined by the dividing resistors $R_3$ and $R_4$, the state of the output signal (c) of the comparator 16 is inverted as illustrated in FIG. 4C.

Thus, the presence of several number of peaks having a relatively high amplitude in the tracking error signal, i.e. the movement of the information reading point accross several sections of the recording track, is detected. In this way, the deviation of the information reading point from the recording track, i.e. the tracking deviation is detected.

Figure 5:
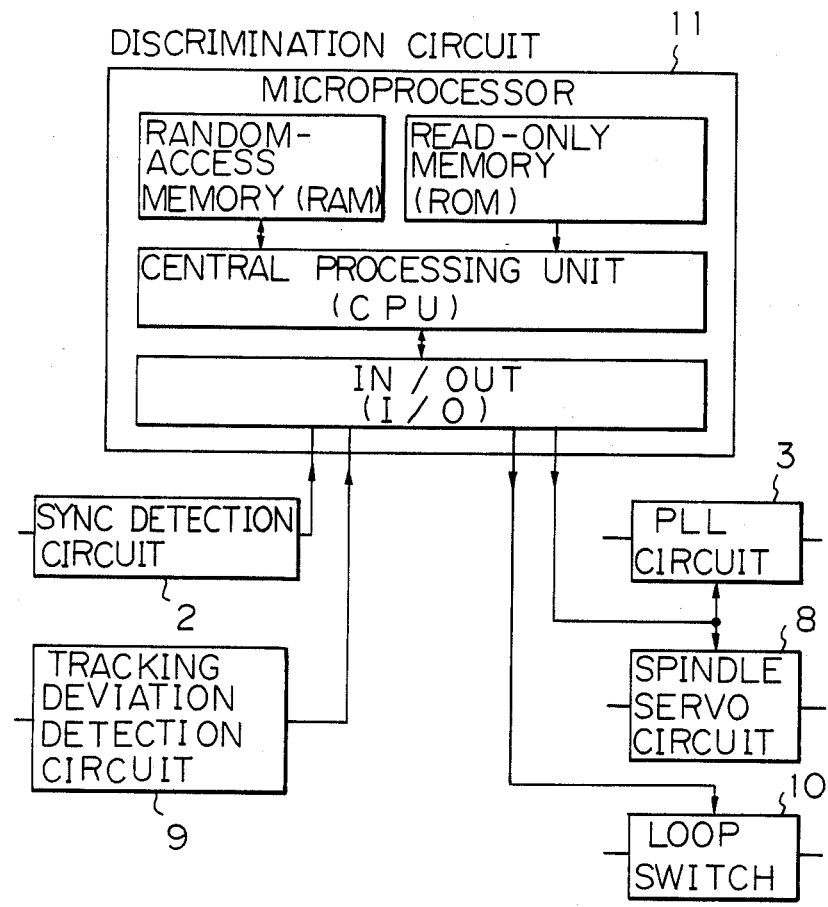
FIG. 5 is a block diagram illustrating an embodiment of the present invention in which a microcomputer is utilized for the discrimination circuit and address memory illustrated in FIG. 2.

Upon detection of the tracking deviation, the tracking deviation detection circuit 9 provides the detection signal to the discrimination circuit 11. The discrimination circuit 11 also receives the output signal of the sync detection circuit 2. The discrimination circuit 11 is, for example, includes a microprocessor unit and the construction is illustrated in FIG. 5. As shown, a microprocessor which forms the discrimination circuit 11 includes a random-access memory (RAM) and a read-only memory (ROM) which are connected to a central processing unit (CPU). The read-only memory stores a predetermined program steps and various temporary data are stored in the random access memory. Transmission of signals to and from the microprocessor is performed through an input/output port (I/O). The discrimination circuit 11 having this construction is connected, through this input/output port, to the sync detection circuit 2, the tracking deviation detection circuit 9, the PLL circuit 3, spindle servo circuit 8, and the loop switch 10 as explained with reference to FIG. 2.

The operation of the discrimination circuit 11 is as follows. When only the sync detection circuit 2 produces the detection signal, it discriminates that the PLL circuit 3 is locked to an erroneous frequency. On the other hand, when only the tracking deviation detection circuit 9 produces the detection signal, it determines that the information reading point is slightly deviated from the recording track at a degree before the loss of control. If both of the sync detection circuit 2 and the tracking deviation circuit 9 produce the detection signal, it discriminates that there is a tracking deviation of a great magnitude which may result in the loss of control.

In the case of the erroneous lock of the PLL circuit 3, the discrimination circuit 11 provides the control signal to the PLL circuit 3 for releasing it from the phase lock state, and the control signal to the spindle servo circuit 8 for the production of the driving signal for maintaining the rotation of the spindle motor. This operation continues until the PLL circuit 3 is locked at the proper frequency and the frame sync signal is produced up to the predetermined number reguarly.

Figure 6:
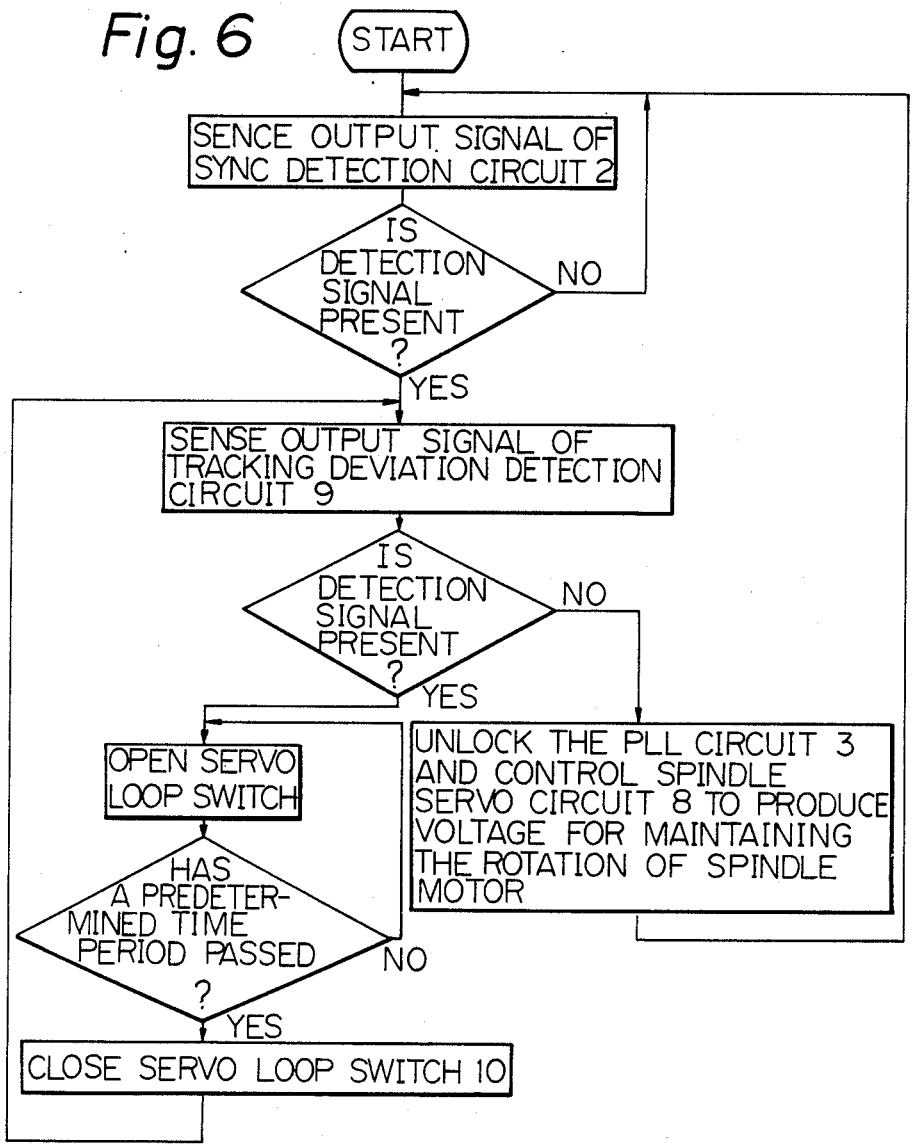
FIG. 6 is a flowchart illustrating the operation of the discrimination circuit illustrated in FIG. 2.

When, the slight tracking deviation is detected, the discrimination circuit 11 does not produce any control signals since there is no fear of the loss of control. When on the other hand, the tracking deviation of great magnitude is detected, the discrimination circuit 11 produces the control signal for opening the loop switch 10, and as a result the transmission of the tracking error signal is disabled to stop the operation of the tracking servo circuit 12 and the carriage servo circuit 13. If desired, an address information which is read out immediately before the occurence of the tracking deviation is stored in the address memory 16 at the same time. By the stoppage of the operation of the tracking servo circuit 12 and the carriage servo circuit 13, the carriage motor is stopped at a position at which the tracking deviation occurs, and the tracking actuator 14 is stopped at a neutral position (a central position of the movable range of the tracking actuator 14). After these operations, the discrimination circuit 11 provides a command signal for closing the loop switch 10 again. With this operation, the tracking servo circuit 12 starts its operation so that the information reading point follows the nearest section of the recording track at that moment. At the same time, the carriage servo circuit 13 restart its operation. Then, in the case where the address information is stored in the address memory 16, the address memory 16 provides the stored address information to the tracking servo circuit 12 and the carriage servo circuit 13, and the tracking servo circuit 12 and the carriage servo circuit 13 are operated to move the information reading point to a position of the corresponding address. The operation of the discrimination circuit 11 explained so far is shown in the flowchart of FIG. 6.

It will be appreciated from the foregoing, according to this embodiment of the invention, the degree of the disorder in the tracking error signal, i.e. whether or not it may lead to the loss of control, can be judged by means of the peak-hold circuit type construction of the tracking deviation detection circuit 9. Thus, it becomes possible to properly deal with a slight disorder in the tracking error signal such as a single shot type disorder in the tracking error signal caused by a defect on the recording disc, for example, a scractch of the disc surface or the finger print on the recording disc.

Further, address memory 16 used in the above described embodiment may be replaced by a microcomputer which is programmed to read the address information and control various search operations. The microcomputer may have the same constructin as the construction illustrated in FIG. 5, and further a microcomputer may be used for both of the discrimination circuit 11 and the address memory 16. In addition, the operation for moving the information reading point to a position corresponding to the address immediately before the occurrence of the tracking deviation which is effected in the above embodiment, can be omitted. Still in such a case, there are advantages of the prevention of the loss of control and the reduction of the time for the resumption. Further, although no operations are effected against the slight tracking deviation in the case of the above embodiment, it is possible to construct the system so that the range of the servo control of the tracking servo circuit and a focus servo circuit (the servo control circuit for the adjustment of the information reading point in the direction perpendicular to the surface of the disc) is made broader once a tracking deviation is detected so as to improve the ability of rejecting the external disturbance.

Figure 7:
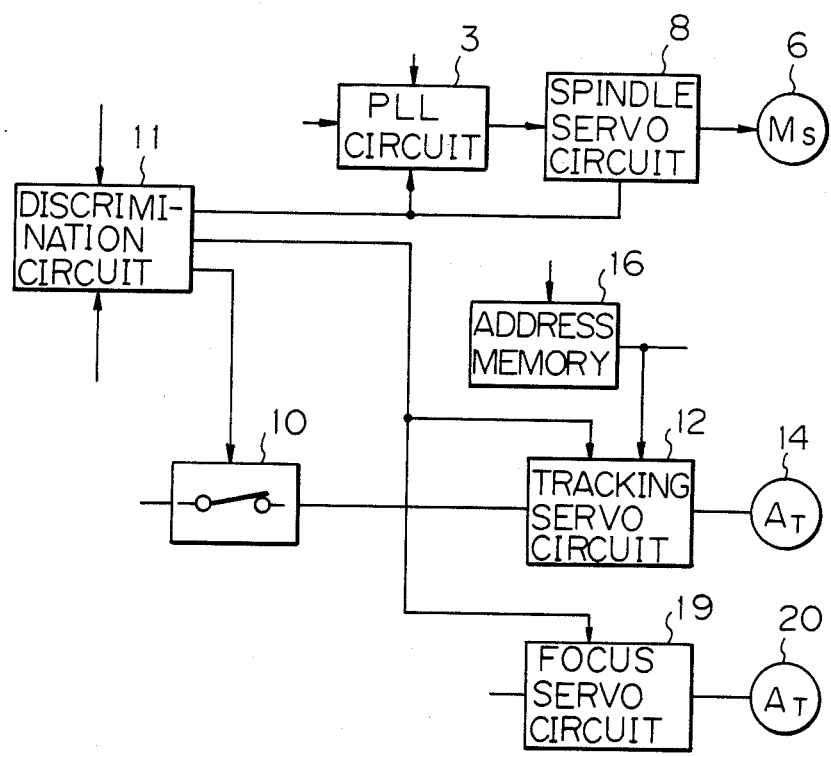
FIG. 7 is a block diagram illustrating a modification of the embodiment of the present invention shown in FIG. 2.

Such a modification of the system according to the present invention is shown in the block diagram of FIG. 7 in which only related circuit portions are illustrated and the remaining circuit portions of the system is identical with the system of FIG. 2. As shown, the discrimination circuit 11 is also connected to the tracking servo circuit 12 and a focus servo circuit 19 which controls a focus actuator 20. The construction of the tracking servo circuit 12 and the focus servo circuit 19 is such that it includes a variable gain attenuator or a variable gain amplifier such as a Voltage Controlled Amplifier or a VCA Voltage Controlled Attenuator whose gain is controlled by an external control signal. Since the construction of such a variable gain circuit is well known in the art, the detailed explanation thereof is not made in this specification. Further, an operational amplifier with a variable (or switchable) input resistance for changing the gain thereof may be utilized. In the case of this example, the gain of the variable gain circuit in the tracking servo circuit 12 and/or the focus servo circuit 19 is increased by a control signal from the discrimination circuit 11 which is generated when only the tracking deviation detection circuit 9 produces the detection signal i.e., when a slight tracking deviation occurs. By this increase in the gain of the variable gain circuit, the servo gain of the servo control circuit is increased which, in turn, results in an increase of the servo gain in a high frequency portion of the servo control range which is normally excluded from the frequency range of the servo control for the purpose of increasing the stability of servo control. In this way, the frequency range of the servo control is made broader in response to the control signal from the discrimination circuit 11.

Thus, according to the present invention, the absence of the frame sync signal in the read out information signal, is detected and the deviation of the information reading point from the recording track is deteted according to the tracking error signal. The operation of at least one of the tracking servo system and the spindle servo system is stopped according to these detection signals. Thus, an information playback system is presented in which the discrimination between the erroneous locking of the PLL circuit and the tracking deviation is effected and the loss of control of the spindle motor, carriage motor, and the tracking actuator is prevented.

It is to be noted that the present invention is applicable to both of the optical system for playing back recorded information and the electro-static type information playback system, and these playback systems take the form of a digital audio disc player system or a video disc player system, for example.

What is claimed is:

1. An information playback system for playing back information signals, including a plurality of synchronizing signals, recorded on a recording disc having at least one recording track, said system having a pickup for picking up the information signal from the recording disc, and comprising:

a tracking error signal generating means for generating a tracking error signal from an output signal of said pickup, said tracking error signal being indicative of a relative distance between an information reading point of said pickup and said recording track in a direction perpendicular to the direction of said recording track;

a first servo control means reponsive to said tracking error signal for controlling a relative position of the information reading point of the pickup from the recording track along a radial direction of the disc;

a second servo system for controlling the rotational speed of the recording disc in accordance with the synchronizing signals contained in a playback signal from the pickup;

a first detection means responsive to said tracking error signal for detecting a first state in which said information reading point has moved across a first predetermined number of sections of the recording track and producing a first detection signal upon detection of said first state;

a second detection means for detecting a second state in which said synchronizing signal is not read out from the playback signal up to a second predetermined number regularly and producing a second detection signal upon detection of said second state; and a control means responsive to said first and second detection means for suspending operation of at least one of said first and second servo control means in accordance with said first and second detection signals.

2. An information playback system as set forth in claim 1, wherein said control means includes a memory means for memorizing address information of said information reading point immediately before said informaation reading point crosses a section of said recording track, and wherein said control means operates to move the position of said information reading point to a position corresponding to the address information memorized in the memory means subsequently to a stoppage of the servo control operation of said first servo control means.

3. An information playback system as set forth in claim 1, wherein said control means operates to stop the servo control operation of said second servo control means when only said second detection signal is produced and to stop the servo control operation of said first servo control system when both said first and second detection signals are produced.

4. An information playback system as set forth in claim 1, wherein said control means operates to broaden a servo control range of said first servo control means when only said first detection signal is produced.

* * * * *